B. O'BRIEN.
Making Confectionery.
No. 8,657.
Patented Jan. 13, 1852.
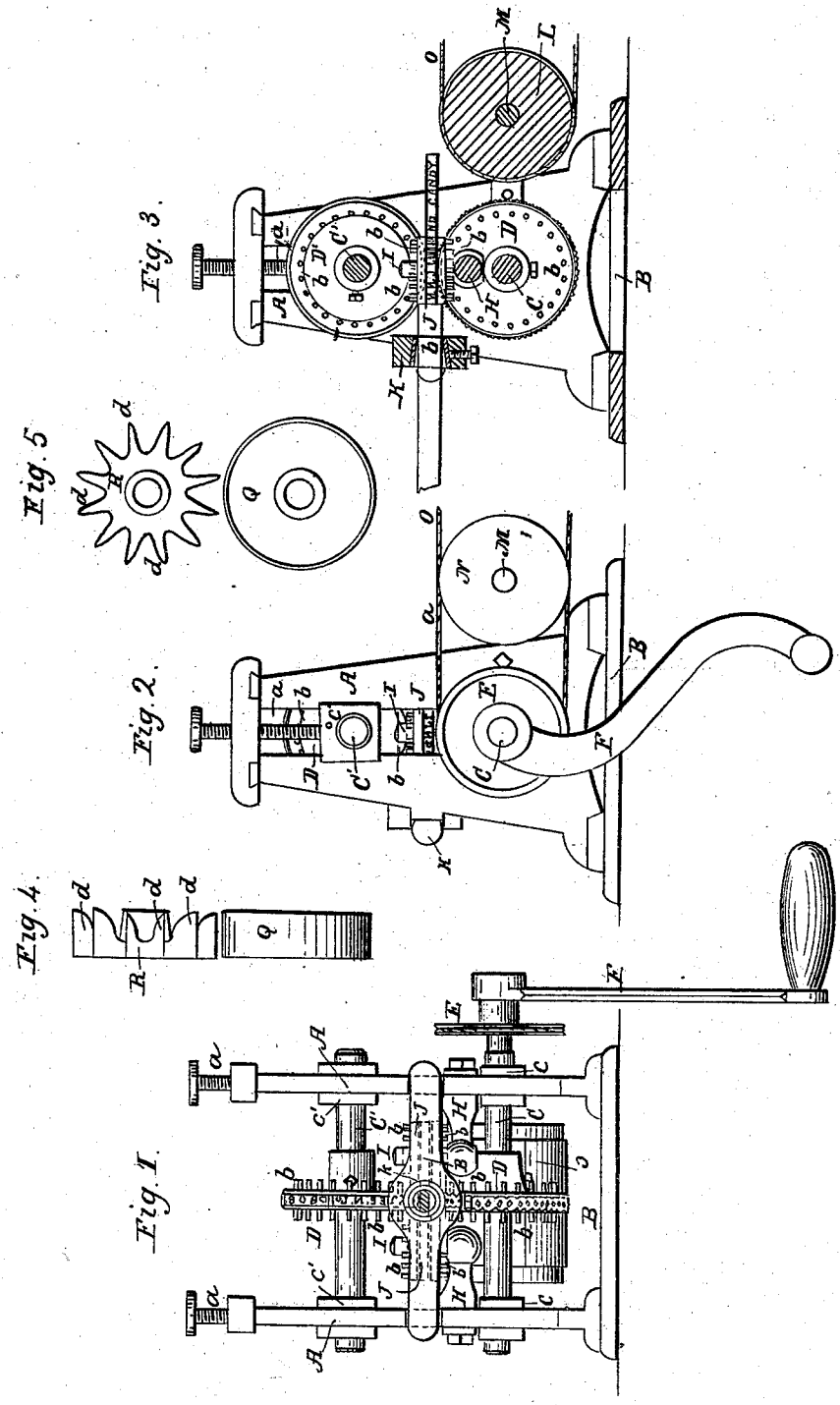

UNITED STATES PATENT OFFICE.

B. O'BRIEN, OF ROCHESTER, NEW YORK.

IMPROVEMENT IN MACHINES FOR MAKING SUGAR CANDY.

Specification forming part of Letters Patent No. 8,657, dated January 13, 1852.

*To all whom it may concern:*

Be it known that I, BARTHOLOMEW O'BRIEN, of Rochester, in the county of Monroe and State of New York, have invented certain new and useful Improvements in Machinery for Rolling, Shaping, Impressing, and Cutting Candy; and I do hereby declare that the following is a full, clear, and exact description of the same, reference being had to the accompanying drawings of the same, forming part of this specification, in which—

Figure 1 is a front elevation. Fig. 2 is a side elevation. Fig. 3 is a vertical section taken at right angles to the axes of the rollers. Fig. 4 is a front view of a cutter and roller differing from the rollers shown in Figs. 1, 2, and 3; and Fig. 5 is a side view of the same.

Similar letters of reference indicate corresponding parts in each of the several figures.

My invention consists, mainly, in the employment of two pairs of plain, figured, or ornamented rollers or rotating pressers, or pressers and cutters, so arranged that any material of plastic nature—such as sugar during the process of candy manufacture—being passed between them will receive their impression on four sides, and will be reduced to a certain shape and thickness. The rollers, pressers, and cutters receive a rotary motion at a uniform speed, and the candy is fed to them through a gage, which reduces it to nearly the required size, and after being drawn through the rollers, formed, and cut to the required length, is received on an endless apron and carried away from the machine.

To enable those skilled in the art to make and use my invention, I will proceed to describe its construction and operation.

A A are two standards, and B a bed-plate, forming the frame of the machine.

C is a shaft or axle hung horizontally in bearing-boxes $c\ c$, which are stationary in the standards A A. It carries a roller, D, (which will be hereinafter described,) a pulley, E, and a winch-handle, F, by which it is turned.

C′ is a shaft or axle hung parallel to C in bearing-boxes $c'\ c'$, which are adjustable at different heights in the standards by means of screws $a\ a$. It carries a roller, D′, of similar size, and in other respects substantially similar to D.

H H are a pair of arms or brackets secured firmly within the standards A A, each carrying a stationary vertical stud, I. Upon each of these studs is hung a roller, J, whose diameter is such as will allow of its periphery nearly touching the sides of the rollers D and D′. The two rollers J J and the rollers D and D′ have all a series of studs or teeth, $b\ b$, on each side at a distance within their peripheries, by which they are geared together, so that when one receives motion it gives motion to all the others in such a direction that the sides of their peripheries which are nearest together move toward the same direction horizontally. The roller D (shown in Figs. 1, 2, and 3) is ornamented on its periphery, while the periphery of D′ has the words "B. O'Brien, Rochester, N. Y." cut upon each half of it, being divided into two parts by knives or cutters $d\ d$, secured to it diametrically opposite each other. The rollers J J have each the words "Jenny Lind Candy" cut upon their peripheries.

K is a bar which is secured across the front of the standards. It has a boss in the middle, which is bored out to receive a conical collar, $k$, which is secured by a set-screw. This collar forms the gage for reducing the stick or piece of candy to be operated upon to the required size before it reaches the rollers. The machine must be provided with several of these collars, to suit various-sized sticks.

L is a drum secured upon a shaft, M, which is hung in bearings in brackets attached to the standards. It is drawn by a band, $n$, which runs from the pulley E to a pulley, N, on its own shaft. Upon this drum and upon another hung on a confectioner's table at a convenient distance from the machine the endless apron O runs.

The operation of the machine is as follows: Rotary motion being given to the shaft C by means of the handle F in the direction of the arrows shown in Figs. 2 and 3, will give motion to the other rollers in the required direction. The candy being introduced through the gage $k$ to the rollers is drawn through or between them and reduced to the proper size and shape, receiving the impression of the maker's name on the top face, the ornamental devices on the lower roller, D, on the under face, and the words "Jenny Lind Candy" on each edge, and being cut off or indented ready for breaking off into sticks of equal length by knives on one or both of the rollers D D′; the sticks being of equal thickness throughout, and consequently all of uniform weight. They are carried by the apron O to the confectioner's table and disposed of as may be thought fit. The thickness of the sticks may be altered by raising or lowering the top roller, D'. The form of the impressions produced upon each side of the stick may be varied indefinitely by differently cut or engraved rollers.

The cylindrical roller Q (represented in Figs. 4 and 5) is intended to be secured upon the shaft C in place of D, and the cutter-wheel R, consisting of a series of cutters, $d$ $d$, arranged around a hub at equal distances apart, is to be secured upon the shaft C', in place of D'. The candy is introduced between them in the same manner as between D and D', and is rolled flat on the under side and cut or indented on the upper side, so that it may be easily broken into short pieces to make kisses. By varying the form of the cutters drops or balls may be made in the same manner.

What I claim as my invention, and desire to secure by Letters Patent, is—

Making candy by machinery, substantially as set forth.

In testimony whereof I have hereunto signed my name, before three subscribing witnesses, this 2d day of September, 1851.

BARTHOLOMEW O'BRIEN.

Witnesses:
HENRY McDONALD,
JOHN GRAHAM,
BENJAMIN SHEDD.